United States Patent
Bisdikian et al.

(10) Patent No.: US 9,262,248 B2
(45) Date of Patent: Feb. 16, 2016

(54) LOG CONFIGURATION OF DISTRIBUTED APPLICATIONS

(75) Inventors: Chatschik Bisdikian, Hawthorne, NY (US); Joel W. Branch, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 13/547,621

(22) Filed: Jul. 12, 2012

(65) Prior Publication Data

US 2014/0013334 A1    Jan. 9, 2014

Related U.S. Application Data

(63) Continuation of application No. 13/542,863, filed on Jul. 6, 2012, now abandoned.

(51) Int. Cl.
*G06F 9/44* (2006.01)
*G06F 11/07* (2006.01)

(52) U.S. Cl.
CPC ........ *G06F 11/0709* (2013.01); *G06F 11/0784* (2013.01)

(58) Field of Classification Search
CPC ..... G06F 21/552; G06F 21/554; G06F 17/40; G06F 3/00; G06F 11/3636
USPC .......................................... 717/121, 127–128
See application file for complete search history.

(56) References Cited

U.S. PATENT DOCUMENTS

| | | | |
|---|---|---|---|
| 6,247,149 B1 * | 6/2001 | Falls | G06F 11/0748 714/45 |
| 7,685,143 B2 | 3/2010 | Tsui et al. | |
| 7,743,029 B2 | 6/2010 | Frey et al. | |
| 8,024,712 B1 | 9/2011 | Korolev et al. | |
| 8,126,943 B2 | 2/2012 | Dudley et al. | |
| 2005/0149535 A1 * | 7/2005 | Frey et al. | 707/100 |
| 2005/0228796 A1 * | 10/2005 | Jung | G06F 17/30917 |
| 2007/0130320 A1 * | 6/2007 | Morgan et al. | 709/224 |
| 2007/0143842 A1 | 6/2007 | Turner et al. | |
| 2007/0225943 A1 * | 9/2007 | Marano | 702/186 |
| 2009/0063395 A1 * | 3/2009 | Klump | G06F 11/079 |
| 2009/0112935 A1 | 4/2009 | Hefta-Gaub | |
| 2009/0271720 A1 | 10/2009 | Deshpande et al. | |
| 2009/0282036 A1 * | 11/2009 | Fedtke | 707/6 |
| 2011/0167048 A1 | 7/2011 | Xiu | |
| 2012/0005542 A1 | 1/2012 | Petersen et al. | |
| 2012/0089568 A1 | 4/2012 | Manley et al. | |

OTHER PUBLICATIONS

Fry, "A Forensic Web Log Analysis Tool: Techniques and Implementation", Sep. 2011, pp. 204.*

(Continued)

*Primary Examiner* — Duy Khuong Nguyen
(74) *Attorney, Agent, or Firm* — F. Chau & Associates, LLC (57) ABSTRACT

A method of configuring a logging utility includes generating, by a computer system, at least one message based on a model of logs from at least two software components of a multi-component application and sending, by the computer system, the message to at least one of the two software components for configuring a logging utility of the corresponding software component.

22 Claims, 10 Drawing Sheets

(56) References Cited

OTHER PUBLICATIONS

Cardo, P. Nicholas; "LOGJAM—A Scalable Unified Log File Archiver", HPCNSA SC'11 IEEE International Conference on, Nov. 12-18, 2011, pp. 1-9.

Branch et al., "A Universal Method for Composing Business Transaction Models Using Logs", IFIP/IEEE International Symposium on, Jun. 1-5, 2009, pp. 17-24.

Selsky et al., "GULP: A Unified Logging Architecture for Authentication Data", 19th Large Installation System Administration Conference, Dec. 8, 2005, pp. 1-5.

IP.COM et al., "A Flexible Logging Method Supporting Dynamic Log Behavior Based on Policies and Runtime Context", IPCOM000179519D, Feb. 16, 2009.

* cited by examiner

```
<Trace Level="MIN">
    <Time Millis="1074688666406">12:37:46.406</Time>
    <IPAddress>111.222.333.10</IPAddress>
    <ServerLoc>Austin</ServerLoc>
    <Component>ServiceManager</Component>
    <LogText><![CDATA[Deployed service AgentStatusService]]></LogText>
</Trace>

<Trace Level="MIN">
    <Time Millis="1074688666406">12:37:47.415</Time>
    <IPAddress>111.222.555.20</IPAddress>
    <ServerLoc>Chicago</ServerLoc>
    <Component>Policy ServiceManager</Component>
    <LogText><![CDATA[Deploying service PolicyManagerService]]></LogText>
</Trace>

<Trace Level="MIN">
    <Time Millis="1074688666406">12:37:49.604</Time>
    <IPAddress>111.222.444.30</IPAddress>
    <ServerLoc>New York</ServerLoc>
    <Component>Policy ServiceManager</Component>
    <LogText><![CDATA[Reading WSDL file at d:\polDir\\SnF\wsdl\\PolicyManager.wsdl]]></LogText>
</Trace>
```

LOG CONFIGURATION OF DISTRIBUTED APPLICATIONS

CROSS-REFERENCE TO RELATED APPLICATIONS

This application is a continuation of U.S. Provisional application Ser. No. 13/542,863 filed on Jul. 6, 2012, the disclosure of which is incorporated by reference herein.

BACKGROUND

1. Technical Field

The present disclosure relates generally to log files, and more particularly to configuring log files of a distributed application.

2. Discussion of Related Art

Computer data logging is a process of recording events, with an automated computer program, in a certain scope to provide an audit trail that can be used to understand the activity of a system and to diagnose problems.

A distributed application is a software system with at least two distinct and interrelated software components that are capable of running on two or more computers and communicating across a computer network. These software components may also reside on a single computer and communicate with each other using internal communications mechanisms.

Each software component can provide its own tool for managing the creation of its log files. However, since there may be a multitude of software components each with their own interface, it can be difficult for a single user to manage all of them. Further, the logs generated by these components may provide information that is redundant or less than useful. Thus, the log files may use up valuable disk space, which may affect the performance of the system.

Accordingly, there is a need for methods and systems for managing log files.

BRIEF SUMMARY

According to an exemplary embodiment of the invention, a method of configuring a logging utility includes generating, by a computer system, at least one message based on a model of logs from at least two software components of a multi-component application and sending, by the computer system, one of the messages to at least one of the two software components for configuring a logging utility of the corresponding software component.

According to an exemplary embodiment of the invention, a method of configuring generation a logging utility includes retrieving logs from at least two software components of a multi-component application, generating states to form a model of the retrieved logs, where each state is representative of at least two related records of the logs, editing the log model to perform at least one of (i) removing at least one of the states, (ii) merging at least two of the states into a single state, and (iii) sub-dividing one of the states into at least two separate states, and configuring a logging utility of at least one of the software components based on the edited model.

According to an exemplary embodiment of the invention, a method of configuring a logging utility includes deriving a log model from logs of at least two software components of a multi-component application, editing the log model to perform at least one of (i) removing one state of the model, (ii) merging two states of the model into a single state, and (iii) sub-dividing one state of the model into at least two separate states; and configuring a logging utility of at least one of the software components based on the edited model.

According to an exemplary embodiment of the invention, a computer system to configure log utilities includes a processor and a memory. The memory stores a log configuration program. The processor is configured to execute the program. The program is configured to generate at least one message based on a model of logs from at least two software components of a multi-component application, and send one of the messages to at least one of the two software components for configuring a logging utility of the corresponding software component.

According to an exemplary embodiment of the invention, a computer system to configure logging utilities includes a processor and a memory. The memory stores a log configuration program. The processor is configured to execute the program. The program is configured to retrieve logs from at least two software components of a multi-component application, generate states from the retrieved logs to form a log model, enable editing of the log model, and configured to send at least one message to a logging utility of at least one of the software components based on the edited model to change how the corresponding logging utility performs logging.

According to an exemplary embodiment of the invention, a computer system to configure logging utilities includes a processor and a memory. The memory stores a log configuration program. The processor is configured to execute the program. The program is configured to derive a log model from logs of at least two software components of a multi-component application, configured to enable the log model to be edited, and configured to send at least one message to a logging utility of at least one of the software components based on the edited model to change how the corresponding logging utility performs logging.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 2 illustrates an example of a log file that may be managed by the method.

DETAILED DESCRIPTION

Figure 1:
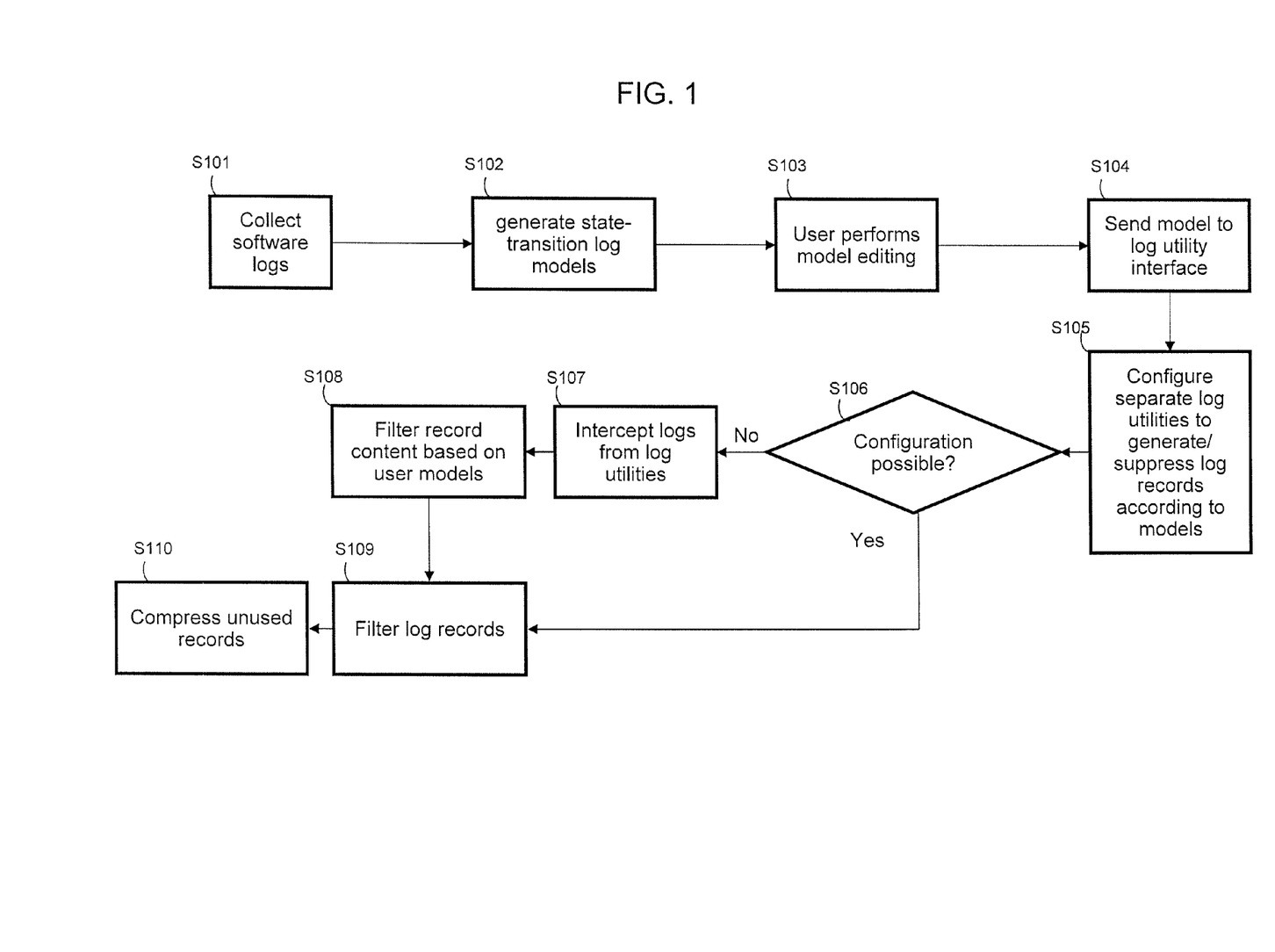
FIG. 1 illustrates a method for managing log files according to an exemplary embodiment of the invention.

FIG. 1 illustrates a method for managing log files according to an exemplary embodiment of the invention. The method includes collecting the software logs (S101). If the logs were previously collected, this step can be omitted. A distributed application or a multi-component application may include several software components. The several software components can run together on the same computer or on multiple computers in a distributed fashion. Thus, the logs generated by these software components can be located on different computers and in different directories. In an embodiment, a process responsible for the collection has knowledge of the location of the logs. For example, the process may have access to a table that stores the network address of each computer, the location of log files generated by each component on that computer, and the file names of the log files, or the name of the tables and the database in which the logs are stored.

FIG. 2 illustrates an example of a log file 200 with an extensible markup language (XML) format. The log file 200 is provided merely as an example, as embodiments of invention are not limited to any particular log file format. For example, embodiments of the invention may interface with various log formats, such log files stored as plain text or logs stored as entries in a relational database. The log file 200 in this example includes a record 210 that includes a logged action or result 215, a time 211 when the action was performed or result was encountered, a component identifier 214 identifying the software component that triggered the action or result, an internet protocol address 212 of the computer that is running the component, and a server location 213 (or hostname) of the computer.

The information provided in the record 210 is merely an example, as the invention is not limited to log files with records of any particular format or number of information fields. For example, some log records may have less or more information. Examples of the logged action or result 215 include an indication that a certain process, thread, or service has been started successfully, could not be started, or was stopped, by the component. Further examples of the logged action or result 215 include an indication that a particular file was read by a component or written to by a component. Additional examples of the logged action or result 215 include an indication that a component is running out of memory, has suffered a fatal exception, has successfully connected or communicated to another component, etc. These examples of logged actions are merely examples, as the invention is not limited to any particular logged event.

In an exemplary embodiment, the collection of the log files includes transferring the log files to a central location using a file transport protocol (e.g., ftp, etc.). Referring back to FIG. 1, once the log files have been collected, the method continues by generating state-transition log models (S102). The generation of the log models may include generation of textual tokens from the logged records based on pre-established tokenization and correlation rules. A log or log file can be modeled as an ordered sequence of transaction records R1, R2, R3 . . . , RN, etc. Each record may be represented by a tuple comprising a timestamp and a collection of tokens according to equation (1) below:

$$R_i=(ts_i, C_i), \text{ where } C_i=\{T_p : p \in PI_i\}, \quad (1)$$

where $ts_i$ represents the time at which a transaction generated the record Ri, and Ci represents a collection of tokens Tp extracted from record Ri indexed according to a position index set PIi. A token may be defined recursively as either a sequence of characters, called a word, or a collection of indexed tokens.

In an exemplary embodiment, white space is used as a delimiter to generate the tokens. For example, text followed by white space, text between white space, and text after white space, each becomes a token. However, embodiments of the invention are not limited any particular delimiter. For example, a delimiter can be any character, number, or string. In an embodiment, a regular expression is used to identify the timestamp of a record.

Figure 3:
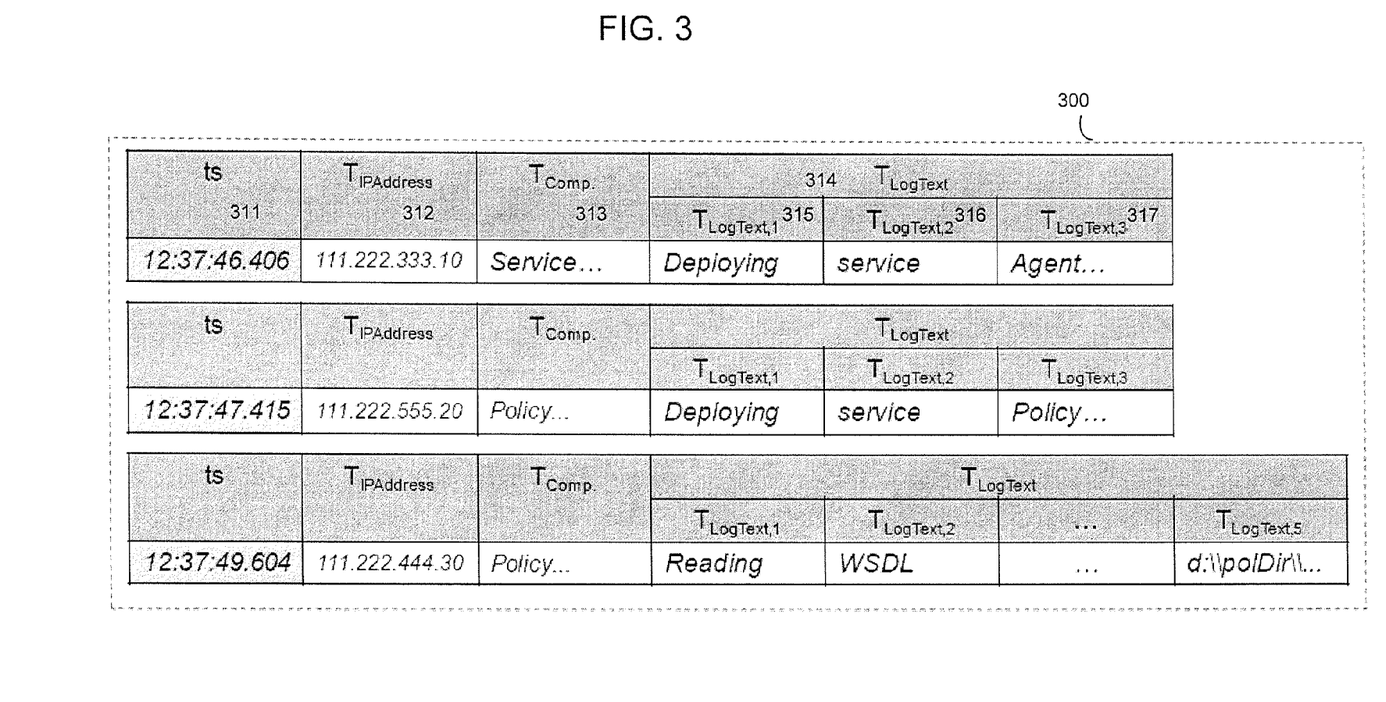
FIG. 3 illustrates an example of record of a log file being split into tokens.

FIG. 3 is an example of an XML-based transaction record tokenization 300. XML-based transaction records provide the benefit of labeled information, which can be exploited during the modeling process. For example, tokens may be first defined using the XML elements IPAddress, Component, and LogText to generate a time token 311, an IP address token 312, a component token 313, and a logText or action token 314, which in turn define the position index sets for the records. The token logtText may be further tokenized in a plain text manner using whitespaces as delimiters to generate tokens 315, 316, and 317.

The tokenization may store an index for each generated token within the tokenized record. The index includes the location or position of the token within the record. For example, the logText token 314 could have an index of 4 within the overall record, while the index of its sub-tokens 315-317 could have indexes 1, 2, and 3 within the logtext token 314.

In an exemplary embodiment, the tokenization rules can be adjusted during a feedback stage and be iteratively improved if necessary. The tokenization rules can be generated without involving a domain expert. For example, it can be assumed that upon previewing the records displayed in FIG. 2, and average user would conclude that XML element Trace is merely a container for other useful information and does not need to be considered as a token on its user. The user may also conclude that the relationship between the IP address (IPAddress) and location (ServerLoc) of a server is known, and therefore merits inclusion of only one of the elements for tokenization.

Candidate transaction states can be generated from the resulting tokens and their indexes within the logged transaction. In the absence of semantic knowledge of transaction records, one can exploit the structural resemblance among transaction records to identify the candidate transaction states. The intuition here is that given an underlying transaction model, a state in the model would generate transaction records that have the same overall structure even though the records may differ in content for different transaction instances.

Clusters of transaction records that share close structural resemblance with each other are identified, and a candidate state is associated with each cluster. The structure of a transaction record R may be defined in terms of the position indices of terminal tokens. For example, in a plain text tokenizer, all resulting tokens could be considered terminal tokens. However, for an XML tokenizer described above, one could consider only the sub-tokens 315-317 of the token 314 (LogText) as the terminal tokens. What constitutes a terminal token may be provided in a pre-defined rule that governs tokenization. Initially, the rules may be specified based on the type of the transaction records or log file (e.g., plain text, XML, database tables, etc.) and by a preliminary examination of records by a non-expert. Later the rules may be enhanced by a domain expert.

Given the terminal tokens, the structure of a record can be defined as the set of indices of the terminal tokens as shown by equation (2).

$$\text{struct}(R)=\{p : p \in PI \text{ and } T_p \text{ is a terminal token}\} \quad (2)$$

Figure 4:
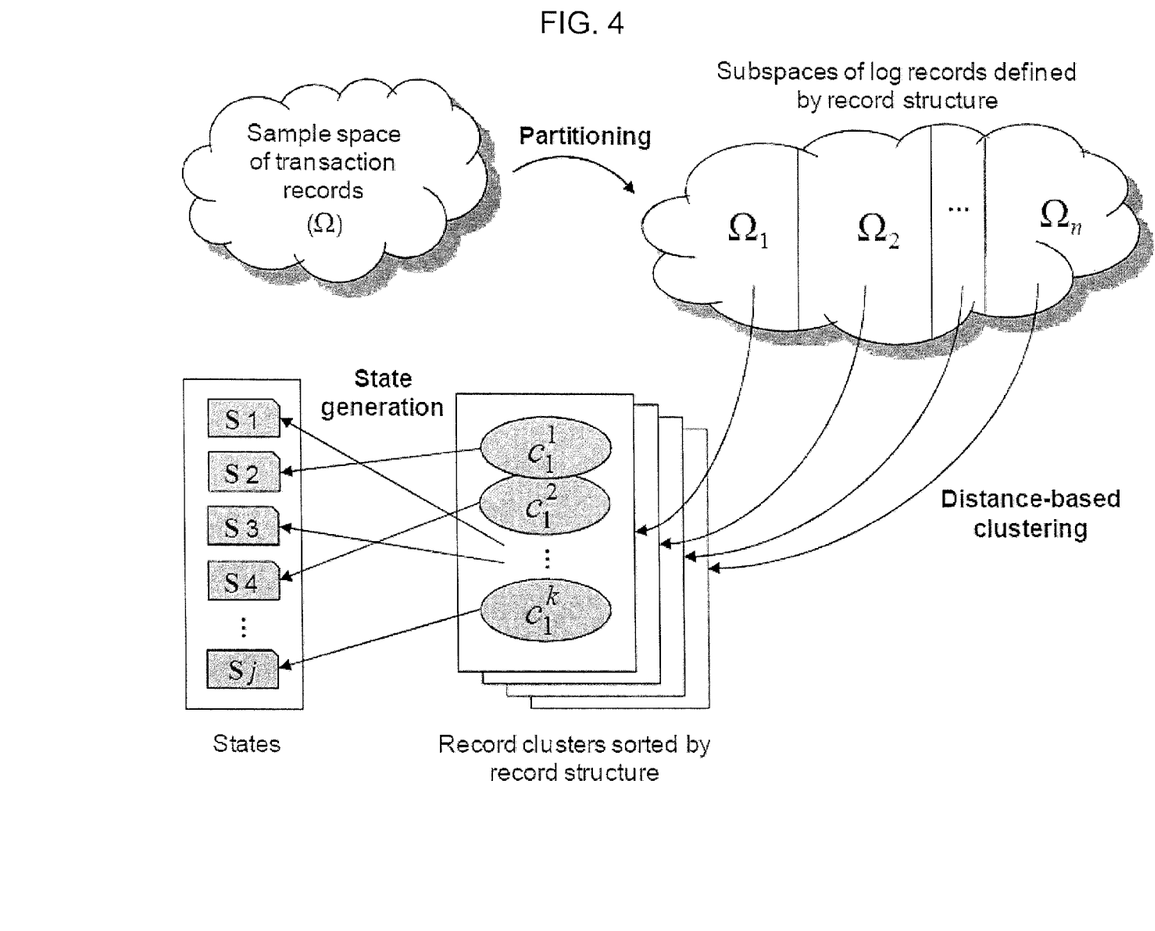
FIG. 4 illustrates an example of states of a log model being generated from records of logs.

To facilitate the comparison between the structure of two records, the data object representing a record R includes a compact representation of struct(R). Using this information, the entire sample space Q of transaction records may be in a given format partitioned by equation (3) as:

$$\Omega = \cup \Omega_{struct}(.), \quad (3)$$

where $\Omega_{struct}(.)$ are disjoint sets and $_{struct}(.)$ denotes the structure of records comprising the set. Essentially, records in each of these sets are structurally compatible with each other. The process of partitioning a group of records into smaller subspaces based on equation 3 is illustrated in the top half of FIG. 4, where the partition indices have been renumbered to write $\Omega = \cup_k \Omega_k$.

Figure 5:
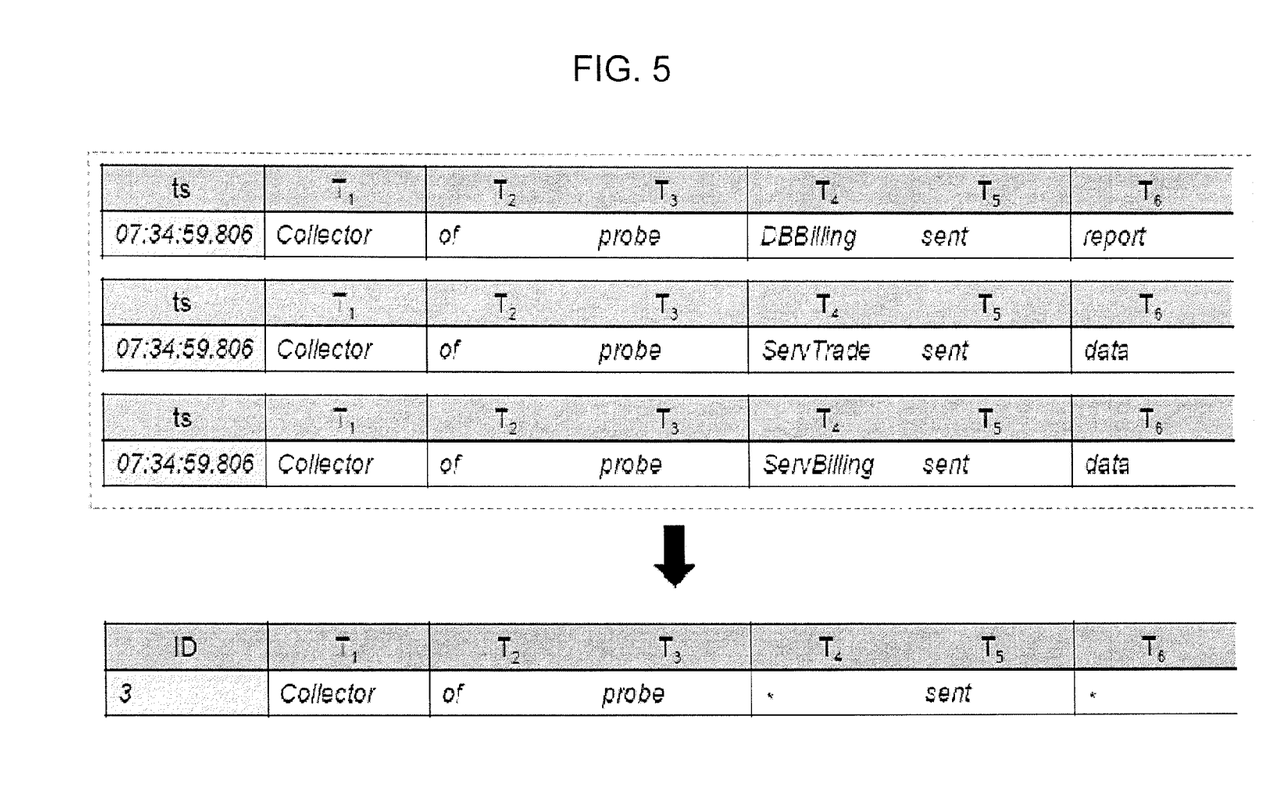
FIG. 5 illustrates a further example of a state of a log model being generated from records of a log.

Following an initial partitioning of transaction records, the contents of the tokens may be used to define a structural distance between records. For example, records may be compared using a Hamming-like distance metric, which is defined as the number of terminal tokens that do not match between two records. For example, in FIG. 5, the first two records differ in two terminal token positions, and hence, the distance between them is 2. This distance can be used to define record clusters within each partition $\Omega_k$ to comprise all the transaction records that have a distance less than a given threshold $T_k$ of each other. A candidate state $S_i$ is assigned to represent such a cluster and can be viewed as a pseudo transaction record in $\Omega_k$ that is closest to all the records in this cluster. The threshold $T_k$ plays the role of a similarity knob that can be used to produce states that represent broad or refined collections of records. While a Hamming-like distance can be used for measuring resemblance of records, alternative distance metric can be used as well.

A state can be defined by equation 4 as follows:

$$Si = (ID_i, C_i'), \text{ where } C_i' = \{TP_p : p \in PI_i\}, \quad (4)$$

where $ID_i$ represents a unique state ID, and $C_i'$ represents a collection of token patterns $TP_p$ indexed according to a position index set $PI_i$. After candidate states are produced, relationships among them are established, through a correlation process, to generate a (set of) candidate transaction model(s). Upon producing a set of candidate, they can be mapped to the original sequence of transaction records from which they are derived. This state sequence may be formed so that temporal-based correlation rules can be used to form actual transaction models. For example, transaction models may be derived using the order of occurrence of the records matching the model's states or even the time intervals between which adjacent records occur.

Referring back to FIG. 1, a user (e.g., a domain expert) may edit the resulting models (S103). The editing may include deletion of states, merging of states, converting a state into at least two separate states, re-ordering of state-transition sequences, etc. For example, a first state can cause or invoke a second state. Thus, an edit that indicates the second state has invoked the first state is an example of re-ordering a state-transition sequence. Further, the editing may include defining thresholds on valid transition times. For example, if a state associated with one or more logged records transitions to another state, but not within a valid transition time, these states could be moved from the model. In this way, the transaction model generation rules can be augmented with a human's domain expertise. Then the framework can rerun the model generation process to derive a set of refined models.

Figure 6:
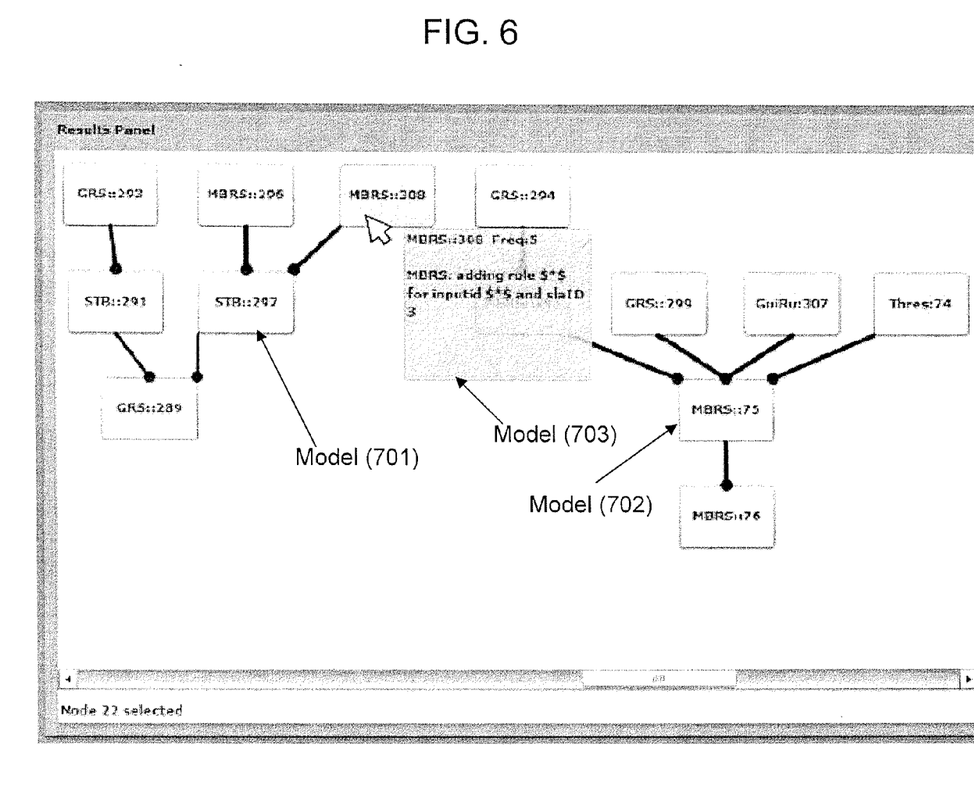
FIG. 6 illustrates an example of the log model.

FIG. 6 shows a set of candidate state models 701 and 702, represented as state-transition diagrams, as drawn by a graphical user interface (GUI). The nodes represent transaction states, the labels insides the nodes are a combination of the first several letters of a first token pattern of a state and a unique numerical state ID, and the edges represent transitions in a top-down manner. Using the GUI, a user can view information about states, such as token patterns that comprise states as shown in the hover-over window 703. The GUI provides editing operations such as deletion (e.g., deletion of one or more states), splitting (e.g., converting an existing state into two or more separate states), and merging (e.g., combining two or more states into a single state). The GUI may also enable a user to specify temporal constraints on transitions. For example, states of a model could be removed if they do not occur within the specified time constraint. In an alternate embodiment, an interface other than a GUI is used to provide the above-described editing functions.

Referring back to FIG. 1, the method includes sending the models to a logging utility interface, which may be referred to as a universal log processing framework (S104). The models may have been edited by a domain expert as discussed above, prior to being sent to the universal framework. The universal framework may receive these models from several disparate software components that are part of a multi-component application. The universal framework may include a function that filters log records based on user feedback. The universal framework may be run on a same computer as a software component, or on a remote computer.

The method includes configuring separate log utilities to generate or suppress log records according to the generated and/or edited models (S105). For example, assume a multi-component application includes components such as a DB2 database and Cognos, the universal framework would attempt to configure the logging utility of DB2 and Cognos based on the resulting models. For example, assume that DB2 is currently generating a log record for each table that is backed up to a file. The model editing performed by a domain expert could have generated a state in a model that indicates the series of records corresponds to a "database backup". For example, individual states that indicate a backup of each table can be merged into a single state that indicates a backup of the database. The universal framework can then configure the log utilities of DB2 to log a single record indicating that the database has been backed up instead of logging one record for each backed up table. In a further example, the editing by the domain expert has removed or deleted some of the states from an existing model. For example, suppose the domain expert is only interested in the backup of table 1 and table 2, but not table 3. The universal framework can configure the logging utility of the DB2 database to stop logging the backup of table 3. In this way, the universal framework has caused suppression of log records that it would normally generate.

In another example, the DB2 database is currently providing the single log record indicating that the database has been backed up, the editing by the domain expert has split the corresponding state into separate states that indicate the backup of each table, and then the universal framework configures the logging utility of the DB2 database to again generate separate log records for each backed up table. In this way, the universal framework has caused additional log records to be generated.

While embodiments of the universal framework have been described configuring a logging utility of a database for logging backup of tables, embodiments of the invention are not limited thereto, as these are merely examples.

The configuring by the universal framework may be performed based on pre-defined rules or policies that describe how one or more original log records should be mapped to new expressions of the records.

In an embodiment, the universal framework includes application specific log configuration adaptors that enable it to configure log utilities of various software components. The log configuration adaptors may be an application programming interface (API) that includes software functions that are called to send computer messages or commands to the log utilities so they may be configured.

In the method of FIG. 1, the universal framework may determine whether configuration of a logging utility is possible (S106). For example, if the logging utility that is to be configured had been upgraded with a version that is incompatible with the adaptors of the universal framework, the universal framework could determine that it is unable to configure the logging utility. If configuration of the logging utility is not possible, the universal framework can be configured to intercept the logs from the logging utility (S107), and filter the record content based on the user generated models (S108). For example, if the edited model indicates that records associated with the backup of table 3 should be discarded, the universal framework can delete such records from the log file.

Whether or not the configuration was possible, the method may include a step of the universal framework filtering the generated log records based on other criteria (S109). For example, suppose first and second logged records are only important if they happen within a first pre-defined time period. The universal framework can be configured to remove the first and second logged records from a log file if they have not occurred within the first pre-defined time period.

Referring back to FIG. 1, the universal framework may compress log records based on certain pre-defined criteria or rules (S110). For example, the universal framework could have rules that specify log records from different components are to be compressed in a different manner. For example, the universal framework could be configured to compress the log files generated by each logging utility using a different or same compression algorithm. For example, the log files or portions thereof that are not filtered out can be compressed. The compressed log files can be saved to a storage component in which the software component is located or to a separate storage component.

Figure 7:
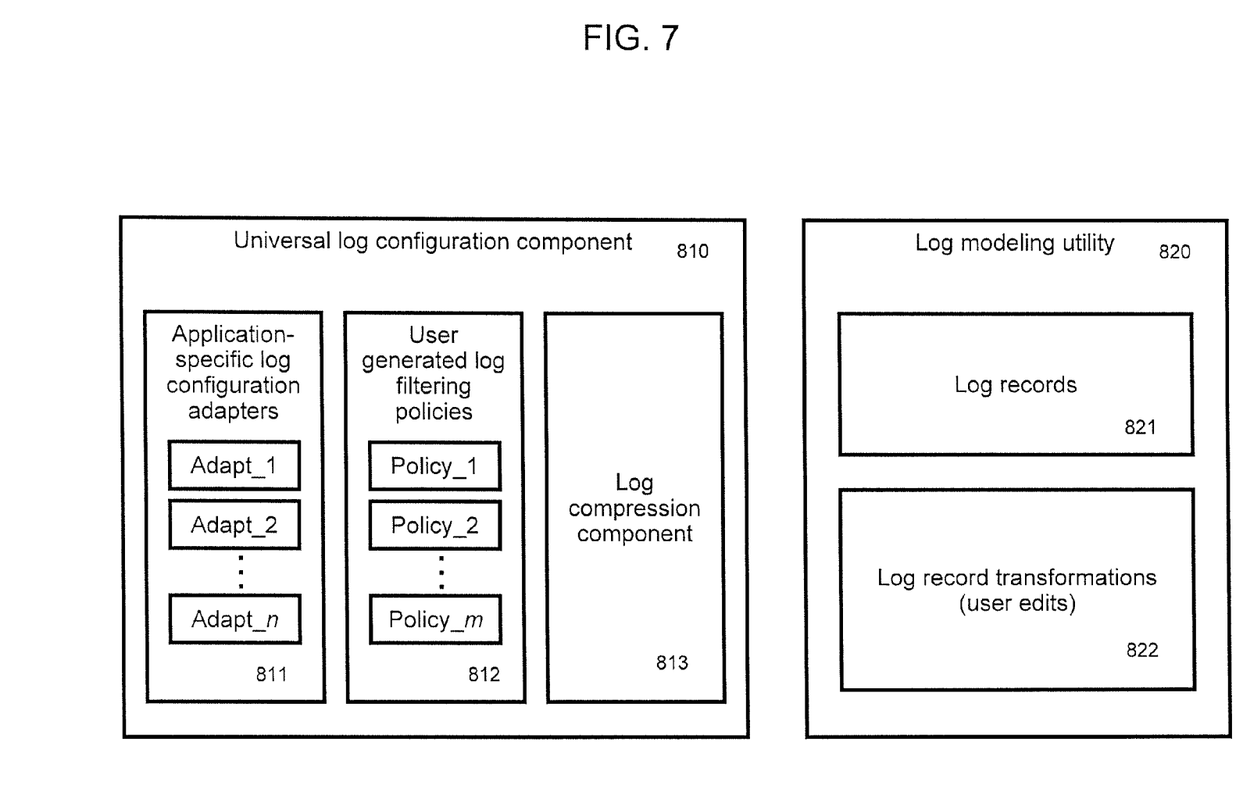
FIG. 7 illustrates an embodiment of a component for configuring logs and a component for modeling the logs, according to an exemplary embodiment of the invention.

FIG. 7 is an example of the universal framework according to an exemplary embodiment of the invention, and a log modeling utility according to an exemplary embodiment of the invention.

The universal framework or a universal log configuration component 810 includes application specific log configuration adaptors 811, a database of user generated log filtering policies 812, and a log compression component 813. The log modeling utility 820 includes a database of logged records 821 and a database of record transformations 822. The adaptors 811 are used to configure the log utilities of each application component of the multi-component application. One of the adaptors 811 may be provided to configure each logging utility, or one of the adaptors 811 may be provided to configure several of the log utilities. The database of filtering policies 812 stores policies that indicate how certain log records are to be filtered out of existing log records. The log compression component 813 is configured to use one or more compression algorithms to compress log files or log records.

The log modeling utility 820 can perform the method of blocks S101 through S104. For example, the log modeling utility 820 may be configured to collect the software records as performed in block S101, generate the state-transition log models as performed in block S102, enable a user to perform model editing as performed in block S103, and send the models to the universal log configuration component 810 as performed in block S104. The collected software logs can be stored in a database of log records 821. The log modeling utility 820 may store transformations used in the model editing in a database of transformations 822.

Figure 8:
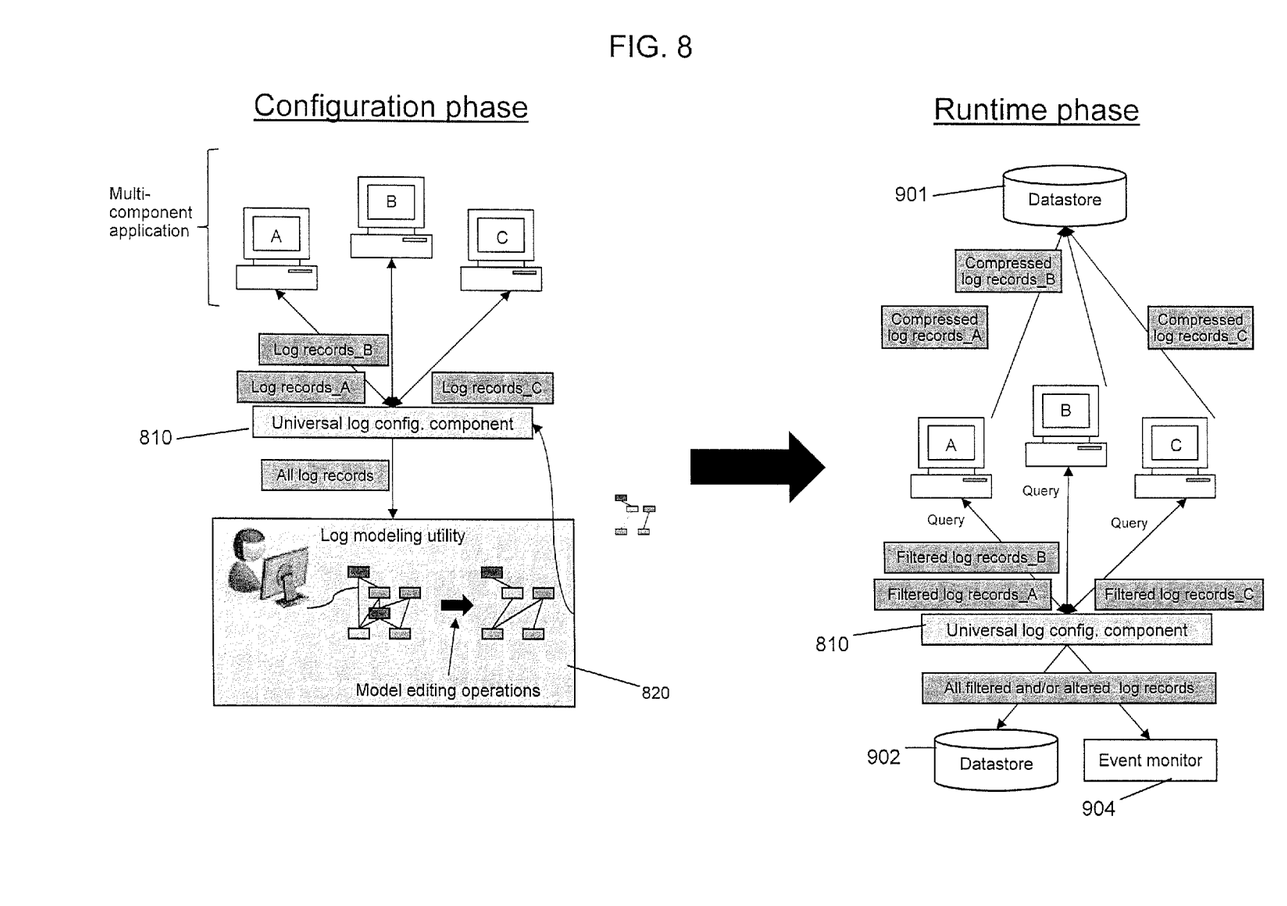
FIG. 8 illustrates a configuration phase and a runtime phase of a system for configuring log utilities according to an exemplary embodiment of the invention.

FIG. 8 illustrates a configuration phase and a runtime phase of a system according to an exemplary embodiment of the invention. In the example shown in FIG. 8, the multi-component application includes three separate software components A, B, and C. During the configuration, records logged by the components (e.g., log records_A, log records_B, log_records_C) are retrieved by the universal log configuration component 810. The component 810 sends all or a subset of the retrieved records to the log modeling utility 820. The log modeling utility 820 generates a model of the logs as described above and allows the model to be edited as described above. The edited model is then sent from the log modeling utility 820 to the universal log configuration component 810. Based on the received edited model, the log configuration component 810 sends commands (messages) to the logging utilities of the components A, B, and C to adjust the logging they perform. For example, the commands can suppress logging of certain events or cause logging of events that are not currently being logged.

Figure 9:
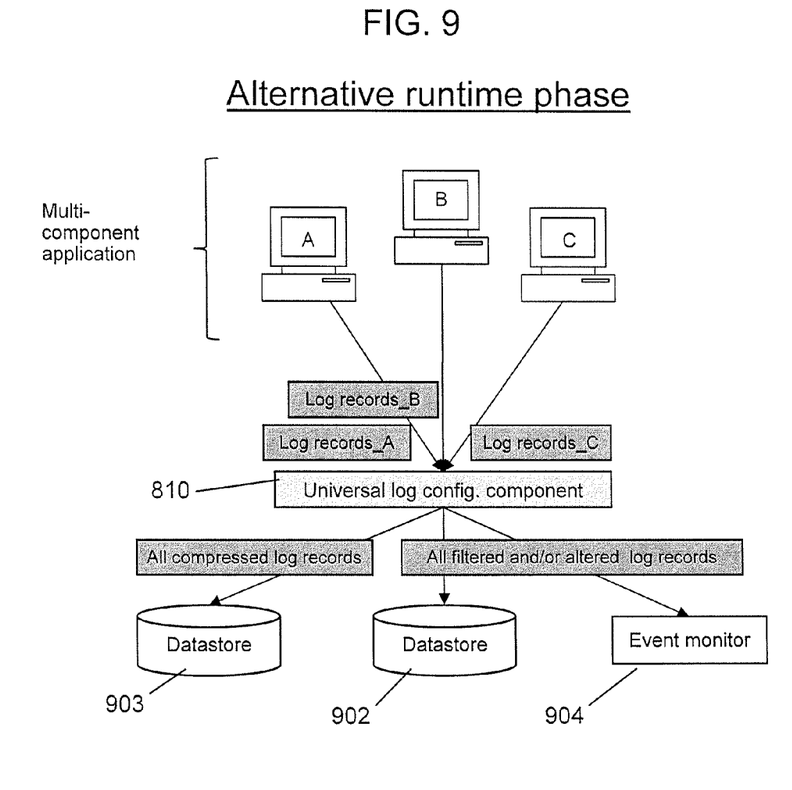
FIG. 9 illustrates a runtime phase of a system for configuring log utilities according to another exemplary embodiment of the invention.

In the runtime phase, i.e., during a system operational phase, the universal log configuration component 810 filters out some of the records it has retrieved from the components based on filtering policies, and sends the filtered records to the components. The records that are not filtered out can be compressed by each of the components and then sent to a data storage device 901. The universal log configuration component 810 may store the filtered out log records and/or the remaining log records in a data storage device 902. An event monitor 904 can monitor changes to the record by the component 810. FIG. 9 illustrates a runtime phase of the system according to another exemplary embodiment of the invention. In this embodiment, the universal log configuration component 810 performs the compression of the log records, and sends the compressed records to a data storage device 903 that it maintains.

Figure 10:
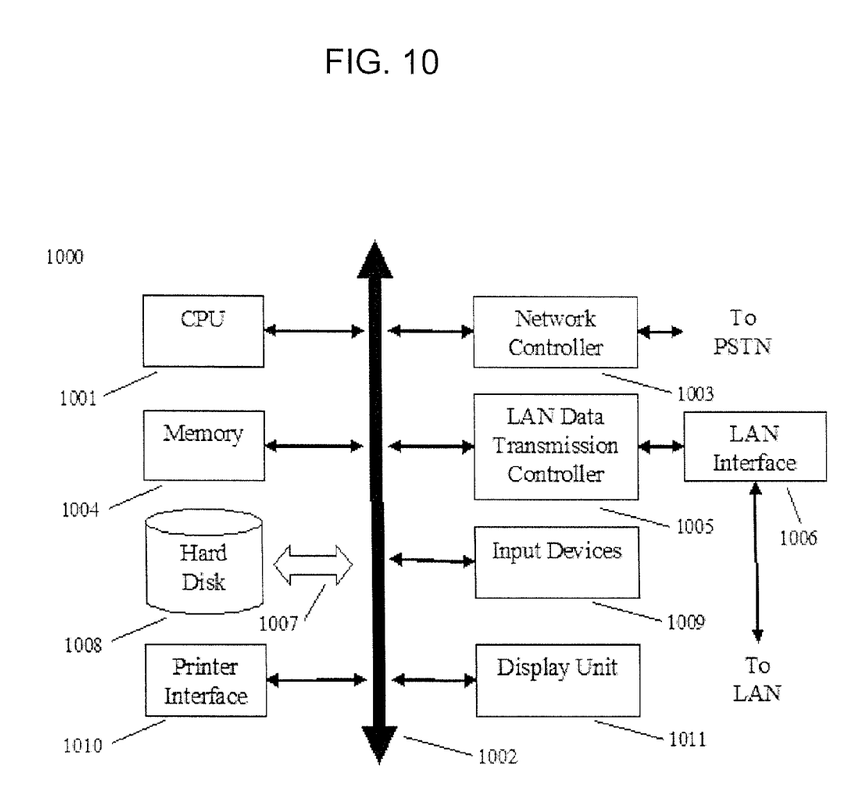
FIG. 10 illustrates an example of a computer system capable of implementing methods and systems according to embodiments of the disclosure.

FIG. 10 illustrates an example of a computer system, which may execute any of the above-described methods, according to exemplary embodiments of the invention. For example, the method of FIG. 1 may be implemented in the form of a software application running on the computer system. Further, portions of the method of FIG. 1 may be executed on one such computer system, while the other portions are executed on one or more other such computer systems. For example, the universal log configuration component 810 could be located on one computer system while the log modeling utility 820 is located on another computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. For example, the display unit 1011 may be used to display a graphical user interface to perform the model editing. As shown, the system 1000 may be connected to a data storage device, for example, a hard disk 1008, via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system to configure logging utilities, the system comprising:
    a processor; and
    a memory, wherein the memory stores a log configuration program configured to interface with a plurality of different software components of a multi-component application, the program comprising software adaptors for configuring respective logging utilities of each of the software components,
    wherein the processor is configured to execute the program,
    wherein the program is configured to:
        generate a model of logs derived from at least two of the software components, wherein each logging utility is initially configured to log each event among a sequence of events in a log and the model indicates that the sequence of events is to be merged into a single representative event;
        determine whether one of the software adaptors for communicating with one of the logging utilities of one of the software components is currently compatible with the one logging utility, the one logging utility generating one of the logs;
        use the one software adaptor to send a message based on the model to the one logging utility for configuring the one logging utility to then only log the single representative event to the one log whenever the sequence of events occurs when the one software adaptor is determined to be compatible; and directly update the one log generated by the one logging utility to replace the sequence of events already logged with the single representative event when the one software adaptor is determined not be compatible, wherein the program is external to the software components.

2. The computer system of claim 1, wherein the log configuration program includes a distinct software adaptor for each software component to enable communication between the program and the software components.

3. The computer system of claim 1, wherein the message includes a command that directs the corresponding logging utility to suppress generation of a log record for an event.

4. The computer system of claim 1, wherein the message includes a command that directs the corresponding logging utility to log an event that is not currently being logged.

5. The computer system of claim 1, wherein the message includes a command that directs the corresponding logging utility to compress logs.

6. The computer system of claim 1, wherein the memory further includes a program configured to compress logs generated by the logging utilities.

7. The computer system of claim 1, wherein the program is configured to retrieve the model from an external software utility and the model includes a state that is representative of at least two related records of the logs.

8. The computer system of claim 7, wherein the state indicates only tokens common to the related records and their respective indexes within those records.

9. The computer system of claim 7, wherein the logs are XML based, plain text, or stored in a relational database.

10. The computer system of claim 1, wherein the memory includes a second program that enables a user to edit the model.

11. The computer system of claim 10, wherein the second program provides a graphical user interface that enables the user to remove a state of the model, merge at least two states of the model, and convert one of the states into at least two separate states.

12. A computer system to configure logging utilities, the system comprising:
a processor; and
a memory, wherein the memory stores a log configuration program comprising a software adaptor,
wherein the processor is configured to execute the program,
wherein the program is configured to retrieve logs from at least two software components of a multi-component application, generate states from the retrieved logs to form a log model, enable editing of the log model, configured to determine whether the software adaptor for communicating with one of the logging utilities of one of the software components that generates one of the logs is currently compatible with the one logging utility, and use the software adaptor to send at least one message to the one logging utility of the one software component based on the edited model to change how the one logging utility performs logging when the software adaptor is determined to be compatible,
wherein the one logging utility is initially configured to log each event among a sequence of events and the message causes the logging utility to then only log a single event representative of the sequence to the one log whenever the sequence occurs, and
wherein the program is configured to directly update the one log generated by the one logging utility to replace the sequence with the single event when the software adaptor is determined not to be compatible,
wherein the program is external to the software components.

13. The computer system of claim 12, wherein the editing enables a user to perform at least one of (i) removing at least one state of the model, (ii) merging at least two states of the model into a single state, and (iii) sub-dividing one state of the model into at least two separate states.

14. The computer system of claim 13, wherein the program causes the logging utility to suppress logging of a previously logged event when the state of the model is removed or when the at least two states are merged.

15. The computer system of claim 13, wherein the configure causes the logging utility to generate a log for an event that is not currently being logged when one of the states of the model is sub-divided.

16. The computer system of claim 13, wherein one of the states indicates tokens shared by the corresponding records and their indexes within these records.

17. A computer system to configure logging utilities, the system comprising:
a processor; and
a memory, wherein the memory stores a log configuration program comprising a software adaptor,
wherein the processor is configured to execute the program,
wherein the program is configured to derive a log model from logs of at least two software components of a multi-component application, configured to enable the log model to be edited, configured to determine whether the software adaptor for communicating with one of the logging utilities of one of the software components that generates one of the logs is currently compatible with the one logging utility, and use the software adaptor to send at least one message to the logging utility of the one software component based on the edited model to change how the one logging utility performs logging when the software adaptor is determined to be compatible,
wherein the one logging utility is initially configured to log each event among a sequence of events and the message causes the logging utility to then only log a single event representative of the sequence to the one log whenever the sequence occurs, and
wherein the program is configured to directly update the one log generated by the one logging utility to replace the sequence with the single event when the software adaptor is determined not to be compatible,
wherein the program is external to the software components.

18. The computer system of claim 17, wherein the program enables a user to perform at least one of (i) removing one state of the model, (ii) merging two states of the model into a single state, and (iii) sub-dividing one state of the model into at least two separate states.

19. The computer system of claim 18, wherein the change causes the logging utility to suppress logging of a previously logged event when the removing or merging is performed.

20. The computer system of claim 18, wherein the change causes the logging utility to generate a log for an event that is not currently being logged when the sub-dividing is performed.

21. A method of configuring a logging utility, the method comprising:
- generating, by a computer system, at least one message based on a model of logs from at least two software components of a multi-component application, where each software component comprises a logging utility that is configured to log a sequence of events and the model indicates the sequence of events is to be merged into a single representative event;
- determining, by the computer system, whether a software adaptor of the system for communicating with one of the logging utilities of one of the software components is currently compatible with the one logging utility, the one logging utility generating one of the logs;
- sending, by the software adaptor of the computer system, one of the messages to the one software component for configuring the one logging utility to only log the single representative event to the one log whenever the sequence of events occur when the software adaptor is determined to be compatible; and
- directly updating, by the computer system the one log generated by the one logging utility to replace the sequence with the single event when the software adaptor is determined not to be compatible,
- wherein the program is external to the software components.

22. The method of claim 21, wherein the model further indicates that another single one of the events is to be converted into a plurality of separate events, and the method further comprises sending another one of the messages to at least one of the software components for configuring the logging utility of the corresponding software component to log all the separate events whenever the another single one event occurs.

* * * * *